July 28, 1970        H. K. JÄGER        3,522,146

INCREASING CAROTENE YIELDS IN BLAKESLEA TRISPORA FERMENTATION

Filed Sept. 23, 1964        10 Sheets-Sheet 1

INFRARED ABSORPTION SPECTRUM OF METHYL BC-FACTOR A

HERBERT K. JÄGER
INVENTOR

ATTORNEYS

ULTRAVIOLET SPECTRUM OF METHYL BC-FACTOR B

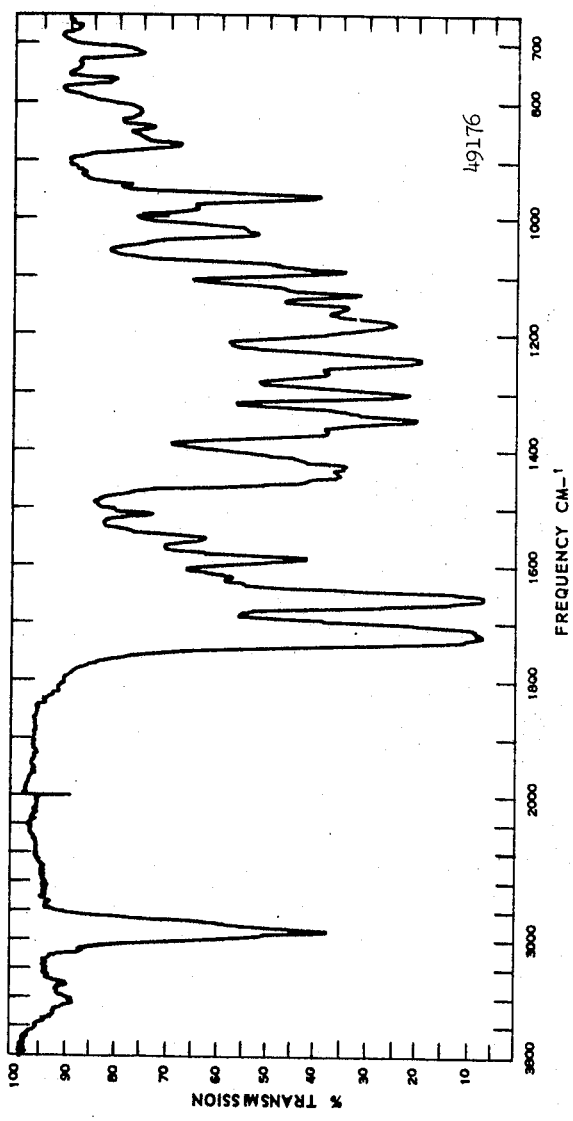

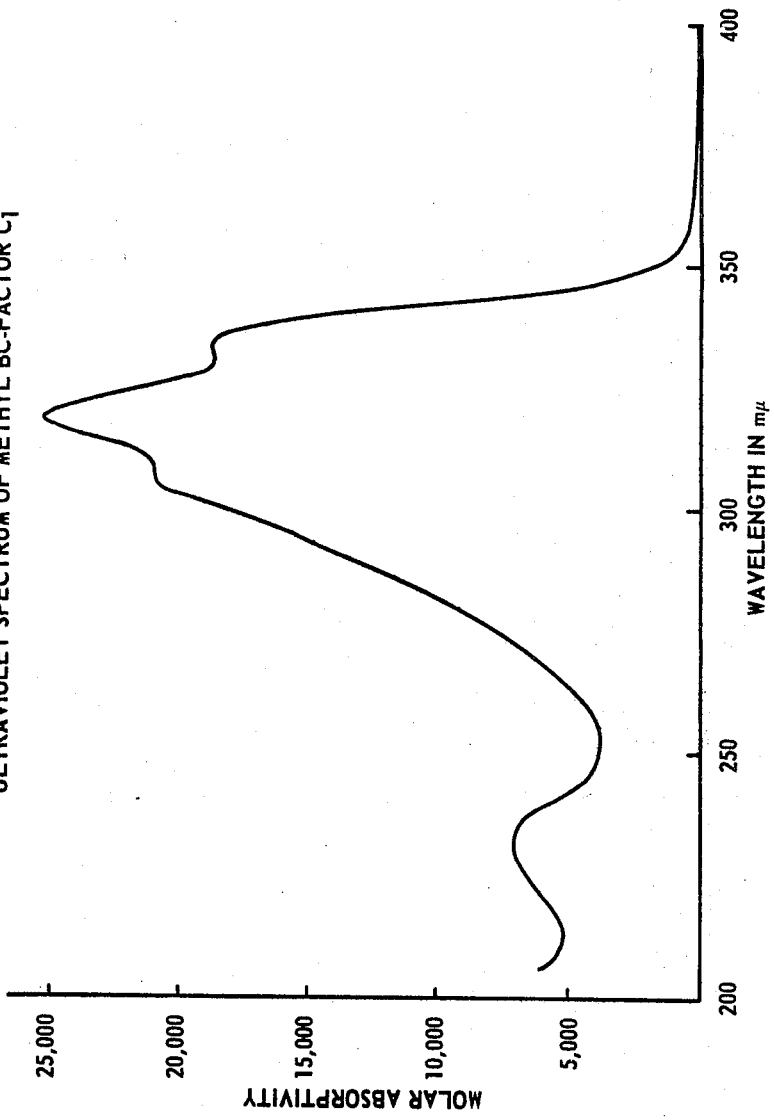

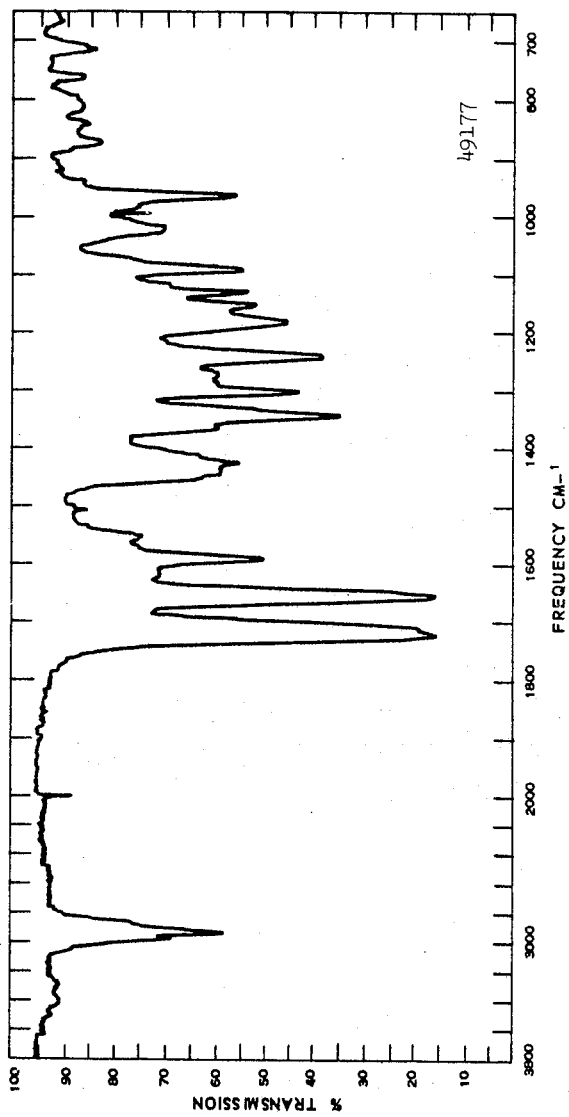

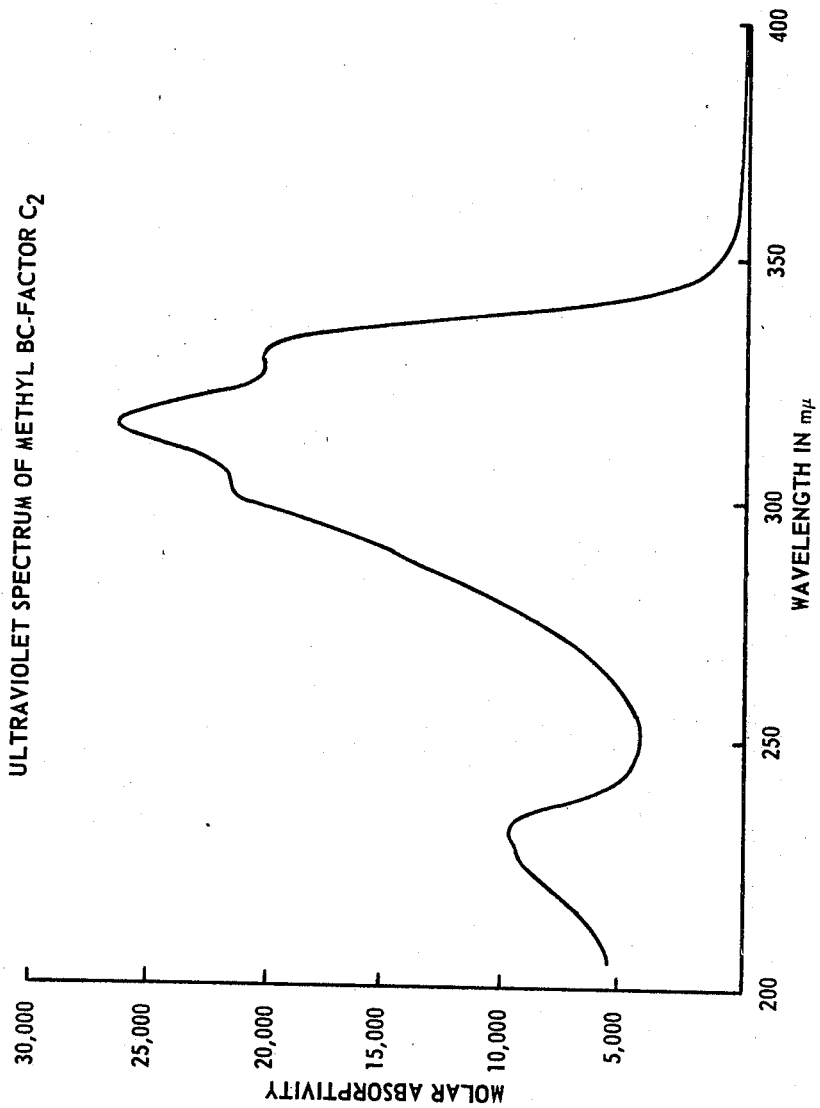

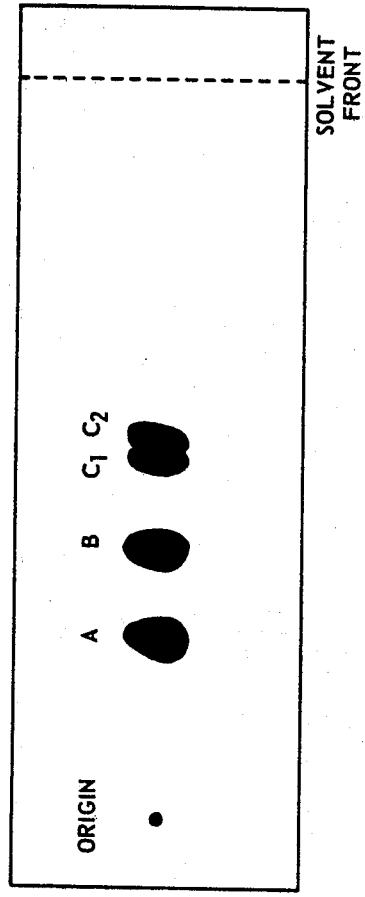

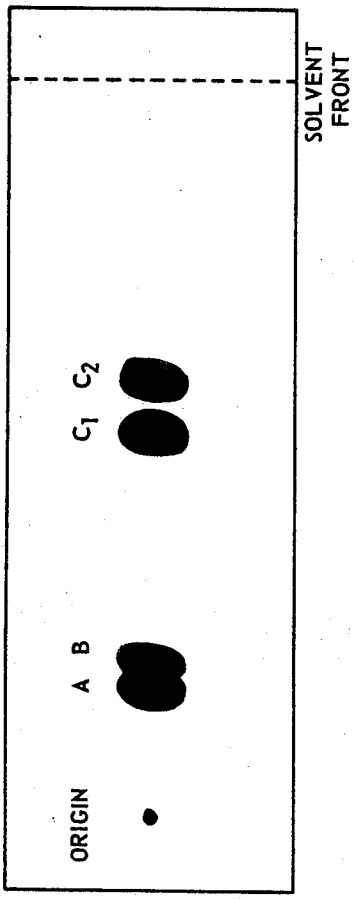

United States Patent Office 3,522,146
Patented July 28, 1970

3,522,146
**INCREASING CAROTENE YIELDS IN *BLAKESLEA TRISPORA* FERMENTATION**
Herbert K. Jäger, Kalamazoo, Mich., assignor to The Upjohn Company, Kalamazoo, Mich., a corporation of Delaware
Filed Sept. 23, 1964, Ser. No. 398,694
Int. Cl. C12d 5/00
U.S. Cl. 195—28                 24 Claims

ABSTRACT OF THE DISCLOSURE

Chemical compound obtained from filtrate of fermentations of mated strains of *Blakeslea trispora* increase yields of carotenes when added to a *Blakeslea trispora* fermentation using either mated strains or the negative strain.

---

Figure 1:
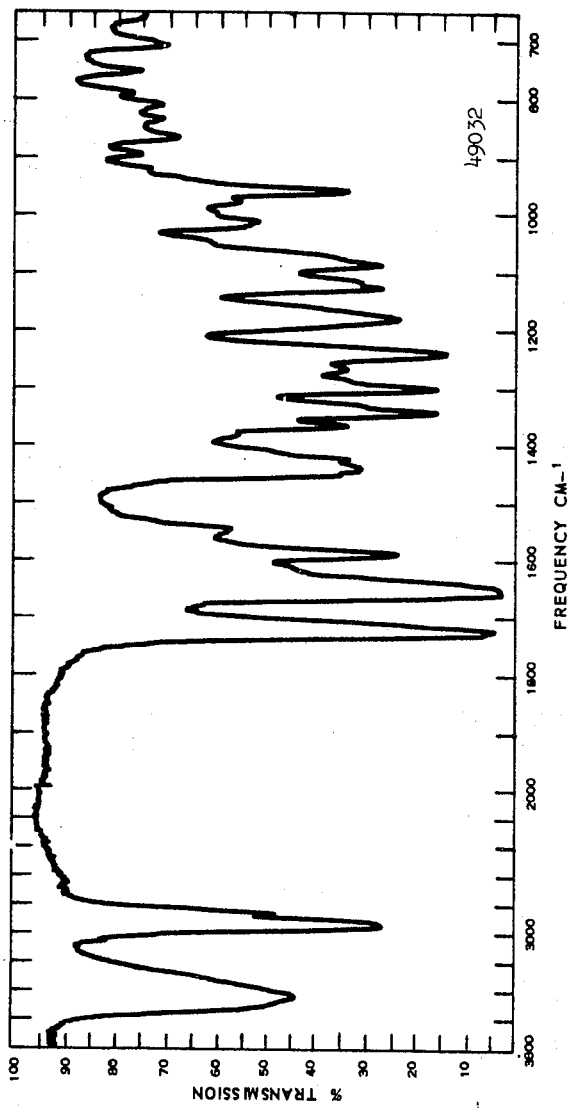

This invention relates to novel compositions of matter and a process for the production thereof. More particularly, this invention relates to new acid compounds designated BC-Factors A, B, $C_1$, and $C_2$, and to processes for their preparation.

The present invention is based on the discovery that fermentations using mated strains of *Blakeslea trispora* contain hitherto unknown chemical compounds in the filtrate. When these compounds or derivatives thereof are added to a *Blakeslea trispora* fermentation using mated strains, or only the negative strain, there is observed an increase in yield of the carotenoid pigments. The degree of stimulation is dependent upon the particular fermentation conditions employed. Increases of carotenoid production by a factor of 2 have been observed in mated strain fermentations; whereas increases by a factor of 20 have been observed in fermentations of the negative strain.

In the course of the purification and isolation of these four closely related BC-Factor acids it was found that they are relatively unstable in their acid form but easily purified and isolated in the form of their esters. The esters retain the activity of the acid in promoting the production of carotenoid pigments.

The novel BC-Factors of the invention can be produced in a fermentation using mixed strains of heterothallic fungi belonging to the class Phycomycetes, and the order Mucorales. Of particular importance are those of the genera Mucor, Blakeslea, Choanephora, Phycomyces, and Parasitella, such as *Mucur hiemalis, Blakeslea trispora, Choanephoro circinans, Choanephoro conjuncta*, and *Choanephora curcurbitarum*. Other fungi from the order Mucorales may also be selected. Many of these fungi are available in public culture collections, and others can be isolated from the air, the soil, putrefying plants, and other natural materials by standard procedures familiar to mycologists. Fermentations as disclosed in U.S. Pat. 3,025,221 and 3,079,380 can be used for the production of the novel BC-Factors of the invention.

In the production of carotenoid pigments, using mated strains of *Blakeslea trispora*, the art has recovered the pigments from the mycelium while the filtrate of the fermentation whole beer has been discarded. It has now been found that the filtrate of the fermentation whole beer contains most of the novel BC-Factors of the invention. These BC-Factors, found predominantly in the filtrate of the fermentation whole beer, can be used to increase the yield of carotenoid pigments in carotenoid fermentations using mated strains or the negative strain of *Blakeslea trispora*. The filtrate can be used in the crude form or concentrated; or the novel BC-Factors can be purified or isolated in the pure form and then added to a fermentation.

The BC-Factor acids of the invention are soluble in many water-miscible organic solvents, such as methanol, ethanol, acetone, dioxane, and in water-immiscible organic solvents, such as chlorinated lower-alkanes, e.g., methylene chloride, chloroform, ethylene dichloride, and the like; lower-alkyl esters of lower alkanoic acids, e.g., ethyl acetate, n-butyl acetate, amyl acetate, and the like; benzene, toluene, and ether. Methylene chloride, toluene, and ethyl acetate are the preferred solvents for the extraction of the BC-Factors.

For the recovery of the BC-Factors from the fermentation beer it is advantageous to separate the mycelial mass from the liquid; this can be done by various known methods in the art, such as filtration, and centrifugation. The filtered beer is preferably concentrated to about 5–20% of its original volume at a temperature below about 50° C. On the addition of one to three volumes of a water-miscible organic solvent, such as acetone (preferred), methanol, ethanol and the like, to this concentrate, undesired materials which are insoluble in the organic solvent added precipitate. The clear supernatant can be decanted and concentrated preferably in vacuo below 50° C. until most of the organic solvent has evaporated. The recovery of BC-Factors from this concentrate can be achieved by first acidifying the concentrate with a mineral acid, for example, sulfuric, hydrochloric, phosphoric, and the like, and then extracting the concentrate with a water-immiscible solvent for the BC-Factor.

Further purification of the BC-Factors can be achieved by extracting them from the organic solvent with a base such as sodium hydroxide, potassium hydroxide, sodium carbonate, and sodium bicarbonate solutions (preferred). The alkaline extract is acidified by adding a mineral acid, as above, until a pH of about 2 is reached, and the acidified extract is then reextracted, as above, with one of the water-immiscible organic solvents. The BC-Factor solution thus-obtained can be washed with a small amount of water, dried, and evaporated to a solvent-free oil which is designated "BC-Factor concentrate."

The BC-Factors can be further purified and separated from each other by chromatographic adsorption techniques, employing such adsorbents as silica gel, alumina, and Florisil (a synthetic silicate of the type described in U.S. Pat. 2,393,625 and sold by the Floridin Company). Silica gel (Merck A.G.) and Florisil are the preferred adsorbents. The adsorbed BC-Factors can be removed from the adsorbent partly separated from each other and in relatively pure form by elution with suitable organic solvent mixtures.

In order to effect good separation of the BC-Factors in their acid state from the adsorbent, it has been found necessary to incorporate small amounts, i.e., 0.1–3%, of a lower fatty acid, for example, acetic acid, propionic acid, butyric acid, valeric acid, and the like, into the eluting solvent mixture.

A preferred solvent mixture for eluting the BC-Factors from silica gel columns is methylene chloride-methanol-acetic acid (95:5:0.3). But combinations such as toluene-butanol-acetic acid (84:12:0.3), toluene-acetone-propionic acid (65:35:1) and the like can be used.

BC-Factors A and B can be separated from each other and from $C_1$ and $C_2$ by the above-disclosed procedures in their acid form; whereas, it has been found necessary to esterify BC-Factors $C_1$ and $C_2$ before separation on a column adsorbent is effected. Conversely, it has been found that BC-Factors A and B are not effectively separated by a column adsorbent when they are in their ester form.

Esterification of the "BC-Factor concentrate" or of BC-Factor acids obtained from an adsorbent, as described above, can be carried out by treatment of the starting material with a diazoalkane, for example, diazomethane, diazoethane, and the like, using procedures well known in the art.

Salts of BC-Factors A, B, $C_1$ and $C_2$ can be made by reacting the BC-Factor acids with an inorganic or organic base by methods well known in the art. BC-Factor salts which can be formed include the sodium, potassium, and calcium, as well as those with organic bases such as primary, secondary, and tertiary mono-, di and polyamines. The salts thus formed are useful for the same purposes as the BC-Factor acids and esters.

When the novel BC-Factors of the invention are added to mixed strain fermentations of *Blakeslea trispora*, or a fermentation using only the negative strain of *Blakeslea trispora*, there is a substantial enhancement in yield of carotenoid pigments. The titer of the carotenoid pigments can be readily followed by spectrophotometric techniques known in the art. For example, fermentation beers containing β-carotene can be assayed by (1) extracting the carotenoids quantitatively with a solvent for carotenoids using methods well known in the art, (2) recording the absorption curve between 300 and 600 m$\mu$ of this extract, and (3) calculating the pigment content of the extract using the spectrum of a solution of pure crystalline β-carotene in the same solvent, and of known concentration as reference.

The BC-Factors are also useful for stimulating the biosynthesis of sterols in microorganisms and for controlling the biosynthesis of steroidal compounds.

The following examples are illustrative of the process and products of the present invention, but are not to be construed as limiting.

EXAMPLE 1

BC-Factors

The whole beer from a 250 liter fermentation using a mated strain fermentation of *Blakeslea trispora*, as referred to above, was filtered and the mycelium, containing the carotenoid pigments, was discarded. The clear beer was concentrated in vacuo below 30° C. to about 50 liters and, with stirring, 100 liters of acetone was added to this concentrate. A viscous, water-soluble material precipitated and the clear supernatant was decanted and saved. The precipitate was dissolved in 5 liters of water and reprecipitated with 10 liters of acetone. The resulting clear supernatant was separated from the precipitate by decantation and combined with the previous supernatant; these two supernatants were concentrated in vacuo below 30° C. to about 40–45 liters. This acetone-free solution containing BC-Factors was adjusted to pH 2 with 4 N hydrochloric acid and extracted twice with 30-liter portions of methylene chloride. The methylene chloride extracts were combined, concentrated in vacuo to 5 liters and then extracted twice with three liter portions of a 1 N sodium bicarbonate solution. The bicarbonate extract containing all of the BC-Factors was acidified to pH 2 with 4 N hydrochloric acid and extracted twice with three liter portions of methylene chloride. The organic layers were combined, washed with 500-ml. distilled water, dried over sodium sulfate, and evaporated in vacuo to a solvent-free, brown oil weighing 233 grams which was designated "BC-Factor concentrate." The total BC-Factor content of this concentrate was determined spectrophotometrically (using $E^{1\%}_{1\,cm.}$ equals 805)

as 43.5%.

Column chromatography

A chromatography column was prepared as follows: 1200 grams of silica gel was stirred into 3500 ml. of a mixture of 950 parts methylene chloride, 50 parts methanol, and 3 parts glacial acetic acid. The resulting slurry was poured into a glass tube (6.2-cm. diameter) and, after settling, formed a 35-inch long column.

Seventeen grams of BC-Factor concentrate, prepared as disclosed above, was uniformly adsorbed on 35 grams of silica gel by dissolving it first in 200 ml. of methylene chloride, adding the adsorbent and evaporating the solvent in a rotary vacuum evaporator. The resulting dry powder was put on top of the column, described above, and development of the chromatogram was started immediately without change of solvent. The BC-Factor content of the fractions (250 ml. portions) collected was as follows:

| Fraction No. | Volume, ml. | BC-Factor Content, mg. | Components |
| --- | --- | --- | --- |
| 1–4 | 1,000 | None | |
| 5–8 | 1,000 | 1,220 | $C_1+C_2$ |
| 9–10 | 500 | 270 | $(C_1)+(C_2)+B$ |
| 11–15 | 1,250 | 2,280 | B |
| 16–17 | 500 | 322 | B+A |
| 18–29 | 3,000 | 3,520 | A |

Each fraction group was concentrated in vacuo below 40° C. to about 20 ml., an equal volume of distilled toluene was added, and evaporation in vacuo was continued. The residue contained traces of acetic acid and, therefore, was evaporated again with 20 ml. of a (1:1) mixture of distilled toluene and distilled n-heptane. By this procedure, BC-Factors A and B were obtained as clear, light yellow oils. Further chromatography of these oils resulted in high purity BC-Factors A and B.

EXAMPLE 2

Esterification of BC-Factors $C_1$ and $C_2$

An ether solution of 2.3 g. of a mixture of BC-Factors $C_1$ and $C_2$, obtained from a column as described above, containing in addition some inactive material, was titrated at ice bath temperature with a cold ether solution of diazomethane prepared as described by A. F. McKay et al., Canadian Journal of Research 283:603, 1950. As soon as the addition of the diazomethane solution no longer caused gas evolution, a 10% excess was added in one portion and the mixture was allowed to stand for 10 min. at room temperature. Excess diazomethane and the solvent were removed in vacuo to leave a mixture of the methyl esters of BC-Factors $C_1$ and $C_2$.

The methyl esters of BC-Factors A and B can be made by the above process. The ethyl esters of BC-Factors A, B, $C_1$ and $C_2$ can also be made by the above process by substituting diazoethane for diazomethane.

EXAMPLE 3

Column chromatography of the methyl esters of BC-Factors $C_1$ and $C_2$.

A chromatography column was prepared as follows: 300 g. of silica gel was stirred into one liter of a mixture of 950 ml. distilled hexane and 50 ml. absolute ethanol. The resulting slurry was poured into a glass tube (1⅝" by 30") and after settling, formed a 25-inch long column.

A mixture of the methyl ester of BC-Factors $C_1$ and $C_2$ (2.3 g.) prepared as in Example 2 was uniformly adsorbed on 6 gm. of silica gel by dissolving it first in 30 ml. of distilled methylene chloride, adding the adsorbent and evaporating the solvent in a rotary vacuum evaporator. The resulting dry powder was put on top of the column described above and the development of the chromatogram was started immediately without change of solvent.

The BC-Factor content of the fractions (50-ml. portions) are as follows:

| Fraction No. | Volume, ml. | BC-Factor Content, mg. | Components |
|---|---|---|---|
| 1-27 | 1,450 | | |
| 28-32 | 250 | 573 | $MeC_1$ |
| 33-35 | 150 | 232 | $MeC_1+MeC_2$ |
| 36-38 | 150 | 439 | $MeC_2$ |
| 39-45 | 350 | 275 | $MeC_2$+impurities. |

Each fraction group was evaporated in vacuo below 40° C. to clear yellow oils. Fractions 28–32 and fractions 36–38 contained BC-Factors $C_1$ and $C_2$, respectively, in pure form, as their methyl esters.

EXAMPLE 4

Two 20-ml. portions of the fermentation medium described by R. F. Anderson, M. Arnold, Y.E.N. Nelson, and A. Cigler [Agricultural and Food Chem., vol. 6, p. 543–5 (1958)] were inoculated with 1 ml. of a 3-day old culture of Blakeslea trispora [(−) NRRL 2457] and incubated with mechanical shaking at 25° C. After 1½ days about 150 mg. of BC-Factor concentrate containing about 20 mg. BC-Factors were added to one of the two flasks and incubation was continued. As early as 12 hours later, the mycelium in the flasks which had received the BC-Factors appeared considerably darker yellow than the mycelium in the control flask. After a total incubation time of 5½ days the mycelium of both flasks was harvested by filtration, extracted with methanol and methylene chloride and analyzed spectrphotometrically. Results see Table 1 following.

The above procedure was followed except that a minus [(−)NRRL 2457] and a plus [(+)NRRL 2456] strain of Blakeslea trispora were used for inoculation (mated strain fermentation). Results see Table 1.

TABLE 1.—INCREASED CAROTENOID PRODUCTION AFTER ADDITION OF BC-FACTORS

| | Carotenoid Content of 20 ml. beer | | |
|---|---|---|---|
| Inoculation | Without BC-Factors, μg. | With BC-Factors, μg. | Increase Factor |
| (−) NRRL 2457 | 120 | 2,160 | 18.0 |
| (−) NRRL 2451 and (+) NRRL 2456 | 3,420 | 7,000 | 2.0 |

Physical and Chemical Characteristics of the BC-Factors

BC-Factor A in acid form:
  Molecular weight as determined by mass spectroscopy: 306
  Molecular formula as determined from mass spectroscopy and combustion analysis:
    $C_{18}H_{26}O_4$ BC-Factor A methyl ester:
  Molecular weight from mass spectroscopy: 320
  Molecular formula from mass spectroscopy and combustion analysis: $C_{19}H_{28}O_4$
  Combustion analysis: C, 70.34; H, 8.84.
  Methoxyl determination: 10.32.
  Optical rotation: $[\alpha]_D^{24}=+34°$ (0.8786 gm./100 ml. methanol)
  U.V. spectrum in cyclohexane (0.00963 gm./l.) is as follows:

| λ max.: | ε/1000: |
|---|---|
| 232 | 9.05 |
| ~303 (sh.) | 20.70 |
| 315 | 25.40 |
| ~329 (sh.) | 19.95 |

Figure 2:
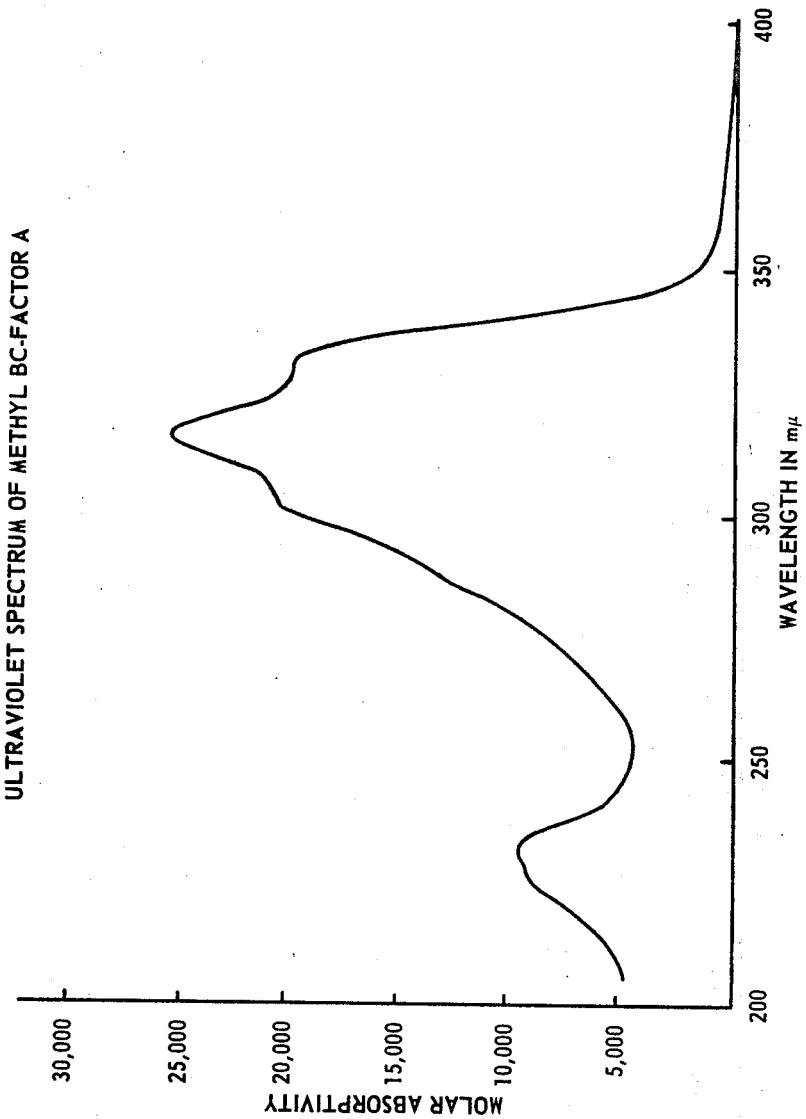

(shown in FIG. 2 of the drawing)

I.R. in liquid film: 3440 cm.$^{-1}$ (s.), 3060 (w.), 2950 (s.), 2930 (s.), 2850 m.), 1730 (s.), 1660 (s.), 1647 (s.), 1597 (s.), 1558 (m.), 1450 (s.), 1438 (s.) 1390 (m.), 1375 (s.), 1353 (s.), 1310 (s.), 1275 (s.), 1248 (s.), 1188 (s.), 1137 (s.), 1125 (s.), 1095 (s.), 1060 (m.), 1023 (m.), 1008 (m.), 990 (m.), 968 (s.), 945 (w.), 932 (w.), 908 (w.), 876 (w.), 845 (w.), 820 (w.), 800 (w.), 760 (w.), 718 (w.), (as shown in FIG. 1 of the drawing).

BC-Factor B in acid form:
  Molecular weight from mass spectroscopy: 306
  Molecular formula from mass spectroscopy and combustion analysis: $C_{18}H_{26}O_4$ BC-Factor B as the methyl ester:
  Molecular weight from mass spectroscopy: 320
  Molecular formula from mass spectroscopy and combustion analysis: $C_{19}H_{28}O_4$
  Combustion analysis: C, 70.55; H, 9.18.
  Methoxyl determination: 10.16
  Optical rotation: $[\alpha]_D^{24}=+29°$ (0.5466 g./100 ml. methanol)
  U.V. spectrum in cyclohexane (0.01770 g./l. cyclohexane):

| λ max.: | ε/1000: |
|---|---|
| 231 | 9.25 |
| ~304 (sh.) | 20.90 |
| 316 | 25.65 |
| ~329 (sh.) | 20.10 |

Figure 4:
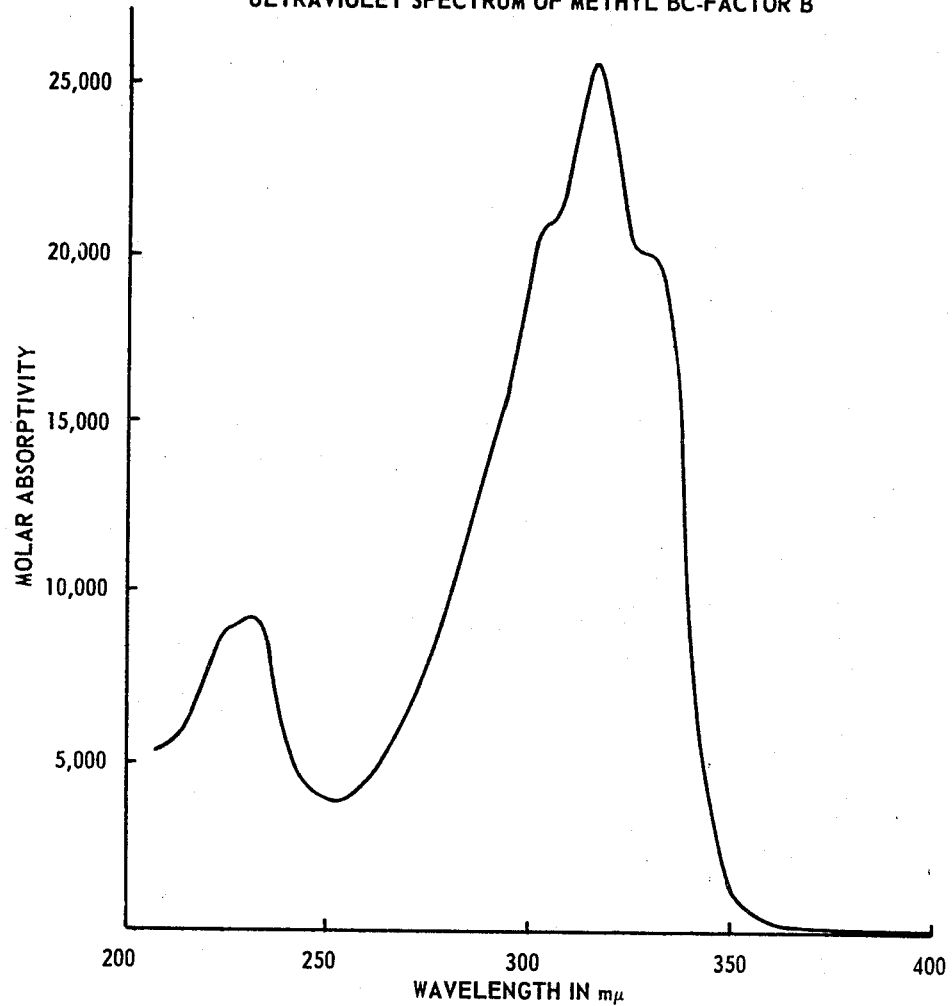

(shown in FIG. 4 of the drawing)

I.R. (in Nujol Mull): 3440 cm.$^{-1}$ (m.), 3070 (w.), 2950 (oil) (s.), 2870 (oil) (m.), 1730 (s.), 1660 (s.), 1625 (m.), 1592 (s.), 1558 (m.), 1460 (oil) (s.), 1452 (s.), 1433 (s.), 1420 (m.), 1375 (oil) (s.), 1352 (s.), 1340 (s.), 1310 (s.), 1275 (m.), 1250 (s.), 1188 (s.), 1135 (s.), 1098 (s.), 1085 (m.), 1063 (m.), 1033 (m.), 1024 (m.), 988 (m.), 968 (s.), 906 (w.), 875 (w.), 845 (m.), 800 (w.), 762 (w.), 715 (w.), (shown in FIG. 3 of the drawing).

BC-Factor $C_1$ methyl ester:
  Molecular weight from mass spectroscopy: 318
  Molecular formula from mass spectroscopy and combustion analysis: $C_{19}H_{26}O_4$
  Combustion analysis: C, 70.48; H, 8.30.
  Methoxyl determination: 10.40
  Optical rotation: $[\alpha]_D^{24}=+35°$ (0.7848 g./100 ml. methanol)
  U.V. spectrum in cyclohexane (0.01133 g./liter cyclohexane):

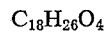

| λ max.: | ε/1000: |
|---|---|
| 232 | 7.00 |
| ~306 (sh.) | 21.00 |
| 318 | 25.30 |
| 333 | 18.85 |

(shown in FIG. 6 of the drawing)

I.R. spectrum has liquid film: 3430 cm.$^{-1}$ (w.), 3300 (w.), 3080 (w.), 2945 (m.), 1725 (s.), 1662 (s.), 1625 (m.), 1593 (m.), 1557 (m.), 1515 (w.), 1507 (w.), 1457 (m.), 1450 (m.), 1432 (m.), 1374 (w.), 1350 (s.), 1340 (m.), 1308 (s.), 1270 (m.), 1247 (s.), 1186 (s.), 1157 (m.), 1135 (s.), 1125 (m.), 1097 (m.), 1030 (m.), 1022 (m.), 988 (m.), 945 (w.), 923 (w.), 910 (w.), 875 (w.), 843 (w.), 815 (w.), 766 (w.), 760 (w.), 745 (w.), 738 (w.), 717 (w.), 670 (w.), (shown in FIG. 5 of the drawing).

BC-Factor $C_2$ methyl ester:
  Molecular weight from mass spectroscopy: 318
  Molecular formula from mass spectroscopy and combustion analysis: $C_{19}H_{26}O_4$
  Combustion analysis: C, 70.37; H, 8.03.
  Methoxyl determination: 10.42
  Optical rotation: $[\alpha]_D^{24}=+43°$ (0.930 g./100 ml. in methanol)

U.V. spectrum in cyclohexane (0.01047 gm./l. cyclohexane):

| λ max.: | ε/1000: |
|---|---|
| 232 | 9.70 |
| ~303 (sh.) | 21.65 |
| 314 | 26.35 |
| ~328 (sh.) | 20.35 |

(shown in FIG. 8 of the drawing)

I.R. spectrum as liquid film: 3420 cm.$^{-1}$ (w.), 3300 (w.), 3060 (w.), 2980 (m.), 2940 (m.), 1730 (s.), 1662 (s.), 1600 (m.), 1562 (w.), 1514 (w.), 1462 (w.), 1448 (w.), 1435 (m.), 1374 (w.), 1352 (m.), 1310 (m.), 1305 (w.), 1248 (m.), 1190 (m.), 1160 (m.), 1138 (m.), 1098 (m.), 1078 (w.), 1025 (w.), 985 (w.), 970 (w.), 945 (w.), 877 (w.), 842 (w.), 815 (w.), 762 (w.), 717 (w.), 667 (w.), (shown in FIG. 7 of the drawing)

The BC-Factors in their acid form are also characterized by thin-layer chromatography as shown in FIG. 9 of the drawing. The plate was developed for one hour with the solvent system methylene chloride:methanol: acetic acid (95:4.7:0.3) and then sprayed with a saturated solution of antimony trichloride (SbCl$_3$) in chloroform. BC-Factors A and B appeared red 10 min. after spraying whereas BC-Factors C$_1$ and C$_2$ appeared yellow.

The BC-Factors as methyl esters were also characterized on thin-layer chromatography using the solvent system n-hexane: absolute ethanol (95:5). The plate was developed for 1 hr. and then sprayed with a saturated solution of antimony trichloride in chloroform. All spots appeared orange about 10 min. after spraying. See FIG. 5 of the drawing.

Figure 3:
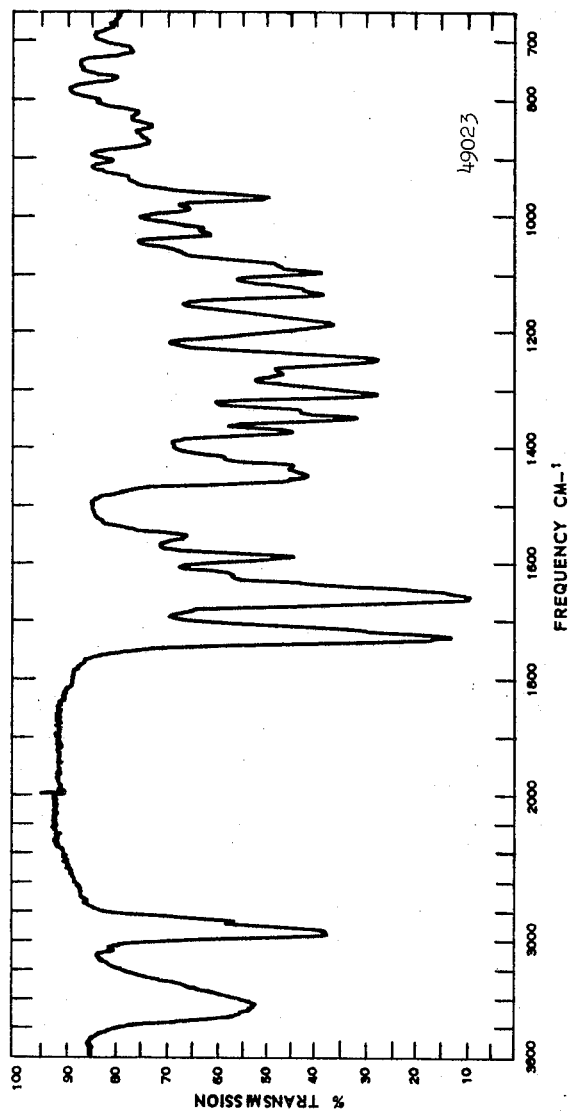

I claim:
1. A substantially anhydrous compound selected from the group consisting of the free acid and esters of BC-Factor A, said BC-Factor A being a compound having
   (a) in the acid form
      (1) a molecular weight of 306 as determined by mass spectroscopy;
      (2) a molecular formula of C$_{18}$H$_{26}$O$_4$;
      (3) a characteristic thin-layer chromatogram as shown in FIG. 9 of the drawing;
   (b) as the methyl ester
      (1) a molecular weight of 320 as determined from mass spectroscopy;
      (2) a molecular formula of C$_{19}$H$_{28}$O$_4$;
      (3) combustion analysis: C, 70.34; H, 8.84;
      (4) methoxyl determination: 10.32;
      (5) optical rotation: $[\alpha]_D^{24} = +44°$ (0.8786 gram per 100 milliliters methanol);
      (6) U.V. spectrum in cyclohexane (0.00963 gm./l.) as follows:

| λ max.: | ε/1000: |
|---|---|
| 232 | 9.05 |
| ~303 (sh.) | 20.70 |
| 315 | 25.40 |
| ~329 (sh.) | 19.95 | and as shown in FIG. 2 of the drawing;
      (7) an I.R. absorption spectrum as shown in FIG. 1 of the drawing; and
      (8) a characteristic thin-layer chromatogram as shown in FIG. 10 of the drawing.
2. Lower alkyl esters of the BC-Filter A compound defined in claim 1.
3. Methyl BC-Factor A, a compound having
   (1) a molecular weight of 320 as determined from mass spectroscopy;
   (2) a molecular formula of C$_{19}$H$_{28}$O$_4$;
   (3) combustion analysis: C, 70.34; H, 8.84;
   (4) methoxyl determination: 10.32;
   (5) optical rotation: $[\alpha]_D^{24} = +44°$ (0.8786 gram per 100 milliliters methanol);
   (6) U.V. spectrum in cyclohexane (0.00963 gm./l.) as follows:

| λ max.: | ε/1000: |
|---|---|
| 232 | 9.05 |
| ~303 (sh.) | 20.70 |
| 315 | 25.40 |
| ~329 (sh.) | 19.95 | and as shown in FIG. 2 of the drawing;
   (7) an I.R. adsorption spectrum as shown in FIG. 1 of the drawing; and
   (8) a characteristic thin-layer chromatogram as shown in FIG. 10 of the drawing.
4. A compound selected from the group consisting of BC-Factor A, according to claim 1, and salts thereof with alkali metal, alkaline earth metal and amines.
5. A substantially anhydrous compound selected from the group consisting of the free acid and esters of BC-Factor B, said BC-Factor B being a compound having
   (a) in the acid form
      (1) a molecular weight of 306 as determined from mass spectroscopy;
      (2) a molecular formula of C$_{18}$H$_{26}$O$_4$;
      (3) a characteristic thin-layer chromatogram as shown in FIG. 9 of the drawing;
   (b) as the methyl ester
      (1) a molecular weight of 320 as determined by mass spectroscopy;
      (2) a molecular formula of C$_{19}$H$_{28}$O$_4$;
      (3) combustion analysis: C, 70.55; H, 9.18;
      (4) methoxyl determination: 10.16;
      (5) optical rotation $[\alpha]_D^{24} = +29°$ (0.5466 gram per 100 milliliters methanol);
      (6) a U.V. spectrum in cyclohexane (0.01770 gm./l.) as follows:

| λ max.: | ε/1000: |
|---|---|
| 231 | 9.25 |
| ~304 (sh.) | 20.90 |
| 316 | 25.65 |
| ~329 (sh.) | 20.10 | and as shown in FIG. 4 of the drawing;
      (7) an I.R. spectrum as shown in FIG. 3 of the drawing; and
      (8) a characteristic thin-layer chromatogram as shown in FIG. 10 of the drawing.
6. Lower alkyl esters of the BC-Factor B compound defined in claim 5.
7. Methyl BC-Factor B, a compound having
   (1) a molecular weight of 320 as determined by mass spectroscopy;
   (2) a molecular formula of C$_{19}$H$_{28}$O$_4$;
   (3) combustion analysis: C, 70.55; H, 9.18;
   (4) methoxyl determination: 10.16;
   (5) optical rotation $[\alpha]_D^{24} = +29°$ (0.5466 gram per 100 milliliters methanol);
   (6) a U.V. spectrum in cyclohexane (0.01770 gm./l.) as follows:

| λ max.: | ε/1000: |
|---|---|
| 231 | 9.25 |
| ~304 (sh.) | 20.90 |
| 316 | 25.65 |
| ~329 (sh.) | 20.10 | and as shown in FIG. 4 of the drawing;
   (7) an I.R. spectrum as shown in FIG. 3 of the drawing; and
   (8) a characteristic thin-layer chromatogram as shown in FIG. 10 of the drawing.
8. A compound selected from the group consisting of BC-Factor B, according to claim 5, and salts thereof with alkali metal, alkaline earth metal, and amines.
9. A substantially anhydrous compound selected from the group consisting of the free acid and esters of BC-Factor C$_1$, said BC-Factor C$_1$ being a compound having as the methyl ester (1) a molecular weight of 318 as determined from mass spectroscopy;
(2) a molecular formula of $C_{19}H_{26}O_4$;
(3) combustion analysis: C, 70.48; H, 8.30;
(4) methoxyl determination: 10.40;
(5) optical rotation $[\alpha]_D^{24} = +35°$ (0.7848 gram per 100 milliliters methanol);
(6) a U.V. spectrum in cyclohexane (0.01133 gm./l.) as follows:

| λ max.: | ε/1000: |
|---|---|
| 232 | 7.00 |
| ~306 (sh.) | 21.00 |
| 318 | 25.30 |
| ~333 | 18.85 | and as shown in FIG. 6 of the drawing;
(7) an I.R. absorption spectrum as shown in FIG. 5 of the drawing;
(8) a characteristic thin-layer chromatogram as shown in FIG. 10 of the drawing; and in its acid form,
(9) a characteristic thin-layer chromatogram as shown in FIG. 9 of the drawing.

10. Lower alkyl esters of the BC-Factor $C_1$ compound defined in claim 9.

11. Methyl BC-Factor $C_1$, a compound having
(1) a molecular weight of 318 as determined from mass spectroscopy;
(2) a molecular formula of $C_{19}H_{26}O_4$;
(3) combustion analysis: C, 70.48; H, 8.30;
(4) methoxyl determination: 10.40;
(5) optical rotation $[\alpha]_D^{24} = +35°$ (0.7848 gram per 100 milliliters methanol);
(6) a U.V. spectrum in cyclohexane (0.01133 gm./l.) as follows:

| λ max.: | ε/1000: |
|---|---|
| 232 | 7.00 |
| ~306 (sh.) | 21.00 |
| 318 | 25.30 |
| ~333 | 18.85 | and as shown in FIG. 6 of the drawing:
(7) an I.R. absorption spectrum as shown in FIG. 5 of the drawing; and
(8) a characteristic thin-layer chromatogram as shown in FIG. 10 of the drawing.

12. A compound selected from the group consisting of BC-Factor $C_1$, according to claim 9, and salts thereof with alkali metal, alkaline earth metal, and amines.

13. A substantially anhydrous compound selected from the group consisting of the free acid and esters of BC-Factor $C_2$, said BC-Factor $C_2$ being a compound having as the methyl ester
(1) a molecular weight of 318 as determined from mass spectroscopy;
(2) a molecular formula of $C_{19}H_{26}O_4$;
(3) combustion analysis: C, 70.37; H, 8.03;
(4) methoxyl determination: 10.42;
(5) optical rotation $[\alpha]_D^{24} = +43°$ (0.930 gram per 100 millliters in methanol);
(6) a U.V. spectrum in cyclohexane (0.01047 gm./l.) as follows:

| λ max.: | ε/1000: |
|---|---|
| 232 | 9.70 |
| ~306 (sh.) | 21.65 |
| 314 | 26.35 |
| ~328 (sh.) | 20.35 | and as shown in FIG. 8 of the drawing;
(7) an I.R. absorption spectrum as shown in FIG. 7 of the drawing;
(8) a characteristic thin-layer chromatogram as shown in FIG. 10 of the drawing; and in its acid form,
(9) a characteristic thin-layer chromatogram as shown in FIG. 9 of the drawing.

14. Lower alkyl esters of the BC-Factor $C_2$ compound defined in claim 13.

15. Methyl BC-Factor $C_2$, a compound having as the methyl ester
(1) a molecular weight of 318 as determined from mass spectroscopy;
(2) a molecular formula of $C_{19}H_{26}O_4$;
(3) combustion analysis: C, 70.37; H, 8.03;
(4) methoxyl determination: 10.42;
(5) optical rotation $[\alpha]_D^{24} = +43°$ (0.930 gram per 100 milliliters in methanol);
(6) a U.V. spectrum in cyclohexane (0.01047 gm./l.) as follows:

| λ max.: | ε/1000: |
|---|---|
| 232 | 9.70 |
| ~303 (sh.) | 21.65 |
| 314 | 26.35 |
| ~328 (sh.) | 20.35 | and as shown in FIG. 8 of the drawing:
(7) an I.R. absorption spectrum as shown in FIG. 7 of the drawing; and
(8) a characteristic thin-layer chromatogram as shown in FIG. 10 of the drawing.

16. A compound selected from the group consisting of BC-Factor $C_2$, according to claim 13, and salts thereof with alkali metal, alkaline earth metal, and amines.

17. BC-Factor concentrate when obtained from a *Blakeslea trispora* fermentation using mated strains of *Blakeslea trispora* in an aqueous nutrient medium under aerobic conditions by
(1) filtering the harvest beer;
(2) concentrating the filtrate;
(3) adding 1 to 3 volumes of a water-miscible organic solvent to the concentrate;
(4) decanting the clear supernatant;
(5) concentrating the supernatant to a concentrate;
(6) acidifying the concentrate with a mineral acid to about pH 2;
(7) extracting the concentrate with a water-immiscible solvent for the BC-factor to give an organic solvent containing the BC-Factors;
(8) extracting the BC-Factors from the organic solvent with a base to give an alkaline extract containing the BC-Factors;
(9) acidifying the alkaline extract with a mineral acid until a pH of about 2 is reached;
(10) extracting the acidified extract with a water-immiscible organic solvent;
(11) washing the thus-obtained BC-Factor solution with water; and
(12) drying and evaporating the solution to a solvent-free oil which is designated BC-Factor concentrate.

18. A process for making the compound in claim 1 which comprises (1) subjecting BC-Factor concentrate comprising an admixture of BC-Factor A, B, $C_1$, and $C_2$ to chromatographic adsorption and (2) isolating BC-Factor A, said BC-Factor A having
(a) in the acid form
(1) a molecular weight of 306 as determined by mass spectroscopy;
(2) molecular formula of $C_{18}H_{26}O_4$;
(3) a characteristic thin-layer chromatogram as shown in FIG. 9 of the drawing;
(b) as the methyl ester
(1) a molecular weight of 320 as determined from mass spectroscopy;
(2) a molecular formula of $C_{18}H_{26}O_4$;
(3) combustion analysis: C, 70.34; H, 8.84;
(4) methoxyl determination: 10.32;
(5) optical rotation: $[\alpha]_D^{24} = +44°$ (0.8786 gram per 100 milliliters methanol);

(6) U.V. spectrum in cyclohexane (0.00963 gm./l.) as follows:

| λ max.: | ε/1000: |
|---|---|
| 232 | 9.05 |
| ~303 (sh.) | 20.70 |
| 315 | 25.40 |
| 329 (sh.) | 19.95 | and as shown in FIG. 2 of the drawing;
(7) an I.R. absorption spectrum as shown in FIG. 1 of the drawing; and
(8) a characteristic thin-layer chromatogram as shown in FIG. 10 of the drawing;
said BC-Factor B having
  (a) in the acid form
    (1) a molecular weight of 306 as determined from mass spectroscopy;
    (2) a molecular formula of $C_{18}H_{26}O_4$;
    (3) a characteristic thin-layer chromatogram as shown in FIG. 9 of the drawing;
  (b) as the methyl ester
    (1) a molecular weight of 320 as determined by mass spectroscopy;
    (2) a molecular formula of $C_{19}H_{28}O_4$;
    (3) combustion analysis: C, 70.55; H, 9.18;
    (4) methoxyl determination: 10.16;
    (5) optical rotation $[\alpha]_D^{24} = +29°$ (0.5466 gram per 100 milliliters methanol);
    (6) a U.V. spectrum in cyclohexane (0.01770 gm./l.) as follows:

| λ max.: | ε/1000: |
|---|---|
| 231 | 9.25 |
| ~304 (sh.) | 20.90 |
| 316 | 25.65 |
| ~329 (sh.) | 20.10 | and as shown in FIG. 4 of the drawing;
(7) an I.R. spectrum as shown in FIG. 3 of the drawing; and
(8) a characteristic thin-layer chromatogram as shown in FIG. 10 of the drawing;
said BC-Factor $C_1$ having as the methyl ester
  (1) a molecular weight of 318 as determined from mass spectroscopy;
  (2) a molecular formula of $C_{19}H_{26}O_4$;
  (3) combustion analysis: C, 70.48; H, 8.30;
  (4) methoxyl determination: 10.40;
  (5) optical rotation $[\alpha]_D^{24} = +35°$ (0.7848 gram per 100 milliliters methanol);
  (6) a U.V. spectrum in cyclohexane (0.01133 gm./l.) as follows:

| λ max.: | ε/1000: |
|---|---|
| 232 | 7.00 |
| ~306 (sh.) | 21.00 |
| 318 | 25.30 |
| ~333 | 18.85 | and as shown in FIG. 6 of the drawing;
(7) an I.R. absorption spectrum as shown in FIG. 5 of the drawing;
(8) a characteristic thin-layer chromatogram as shown in FIG. 10 of the drawing; and in its acid form,
(9) a characteristic thin-layer chromatogram as shown in FIG. 9 of the drawing;
and said BC-Factor $C_2$ having as the methyl ester
  (1) a molecular weight of 318 as determined from mass spectroscopy;
  (2) a molecular formula of $C_{19}H_{26}O_4$;
  (3) combustion analysis: C, 70.37; H, 8.03;
  (4) methoxyl determination: 10.42;
  (5) optical rotation $[\alpha]_D^{24} = +43°$ (0.930 gram per 100 milliliters in methanol);
(6) a U.V. spectrum in cyclohexane (0.01047 gm./l.) as follows:

| λ max.: | ε/1000: |
|---|---|
| 232 | 9.70 |
| ~303 (sh.) | 21.65 |
| 314 | 26.35 |
| ~328 (sh.) | 20.35 | and as shown in FIG. 8 of the drawing;
(7) an I.R. absorption spectrum as shown in FIG. 7 of the drawing;
(8) a characteristic thin-layer chromatogram as shown in FIG. 10 of the drawing; and in its acid form,
(9) a characteristic thin-layer chromatogram as shown in FIG. 9 of the drawing.

19. A process of separating the BC-Factor B from the admixture of BC-Factor A, B, $C_1$, and $C_2$, as recited in claim 18, which comprises
  (1) subjecting BC-Factor concentrate comprising an admixture of BC-Factor A, B, $C_1$ and $C_2$ to chromatographic adsorption;
  (2) eluting from said chromatographic adsorption with an organic solvent mixture, and
  (3) isolating BC-Factor B.

20. A process of separating the BC-Factor $C_1$ from the admixture of BC-Factor A, B, $C_1$, and $C_2$, as recited in claim 18, which comprises
  (1) esterifying said BC-Factor concentrate with a diazoalkane;
  (2) subjecting said esterified BC-Factor concentrate comprising an admixture of BC-Factor A, B, $C_1$ and $C_2$ to chromatgraphic adsorption;
  (3) eluting from said chromatographic adsorption with an organic solvent mixture, and
  (4) isolating BC-Factor $C_1$ ester.

21. A process of separating the BC-Factor $C_2$ from the admixture of BC-Factor A, B, $C_1$, and $C_2$, as recited in claim 18, which comprises
  (1) esterifying said BC-Factor concentrate with a diazoalkane;
  (2) subjecting said esterified BC-Factor concentrate comprising an admixture of BC-Factor A, B, $C_1$ and $C_2$ to chromatographic adsorption;
  (3) eluting from said chromatographic adsorption with an organic solvent mixture, and
  (4) isolating BC-Factor $C_2$ ester.

22. In a process for increasing the titer of carotenoids in a mated strain fermentation of *Blakeslea trispora*, the improvement which comprises adding BC-Factor concentrate to the fermentation, said concentrate comprising an admixture of BC-Factor A, B, $C_1$, and $C_2$ and being present in the fermentation medium during the fermentation by *Blakeslea trispora*, said BC-Factor A having
  (a) in the acid form
    (1) a molecular weight of 306 as determined by mass spectroscopy;
    (2) a molecular formula of $C_{18}H_{26}O_4$;
    (3) a characteristic thin-layer chromatogram as shown in FIG. 9 of the drawing;
  (b) as the methyl ester
    (1) a molecular weight of 320 as determined from mass spectroscopy;
    (2) a molecular formula of $C_{19}H_{28}O_4$;
    (3) combustion analysis: C, 70.34; H, 8.84;
    (4) methoxyl determination: 10:32;
    (5) optical rotation: $[\alpha]_D^{24} = +44°$ (0.8786 gram per 100 milliliters methanol);
    (6) U.V. spectrum in cyclohexane (0.00963 gm./l.) as follows:

| λ max.: | ε/1000: |
|---|---|
| 232 | 9.05 |
| ~303 (sh.) | 20.70 |
| 315 | 25.40 |
| ~329 (sh.) | 19.95 | and as shown in FIG. 2 of the drawing;
(7) an I.R. absorption spectrum as shown in FIG. 1 of the drawing; and
(8) a characteristic thin-layer chromatogram as shown in FIG. 10 of the drawing;

said BC-Factor B having
(a) in the acid form
(1) a molecular weight of 306 as determined from mass spectroscopy;
(2) a molecular formula of $C_{18}H_{26}O_4$;
(3) a characteristic thin-layer chromatogram as shown in FIG. 9 of the drawing;
(b) as the methyl ester
(1) a molecular weight of 320 as determined by mass spectroscopy;
(2) a molecular formula of $C_{19}H_{28}O_4$;
(3) combustion analysis: C, 70.55; H, 9.18;
(4) methoxyl determination: 10.16;
(5) optical rotation $[\alpha]_D^{24} = +29°$ (0.5466 gram per 100 milliliters methanol);
(6) a U.V. spectrum in cyclohexane (0.01770 gm./l.) as follows:

| $\lambda$ max.: | $\epsilon/1000$: |
|---|---|
| 231 | 9.25 |
| ~304 (sh.) | 20.90 |
| 316 | 25.65 |
| ~329 (sh.) | 20.10 | and as shown in FIG. 4 of the drawing;
(7) an I.R. spectrum as shown in FIG. 3 of the drawing; and
(8) a characteristic thin-layer chromatogram as shown in FIG. 10 of the drawing;

said BC-Factor $C_1$ having as the methyl ester
(1) a molecular weight of 318 as determined from mass spectroscopy;
(2) a molecular formula of $C_{19}H_{26}O_4$;
(3) combustion analysis: C, 70.48; H, 8.30;
(4) methoxyl determination: 10.40;
(5) optical rotation $[\alpha]_D^{24} = +35°$ (0.7848 gram per 100 milliliters methanol);
(6) a U.V. spectrum in cyclohexane (0.01133 gm./l.) as follows:

| $\lambda$ max.: | $\epsilon/1000$: |
|---|---|
| 232 | 7.00 |
| ~306 (sh.) | 21.00 |
| 318 | 25.30 |
| ~333 | 18.85 | and as shown in FIG. 6 of the drawing;
(7) an I.R. absorption spectrum as shown in FIG. 5 of the drawing;
(8) a characteristic thin-layer chromatogram as shown in FIG. 10 of the drawing; and in its acid form,
(9) a characteristic thin-layer chromatogram as shown in FIG. 9 of the drawing;

and said BC-Factor $C_2$ having as the methyl ester
(1) a molecular weight of 318 as determined from mass spectroscopy;
(2) a molecular formula of $C_{19}H_{26}O_4$;
(3) combustion analysis: C, 70.37; H, 8.03;
(4) methoxyl determination: 10.42;
(5) optical rotation $[\alpha]_D^{24} = +43°$ (0.930 gram per 100 milliliters in methanol);
(6) a U.V. spectrum in cyclohexane (0.01047 gm./l.) as follows:

| $\lambda$ max.: | $\epsilon/1000$: |
|---|---|
| 232 | 9.70 |
| ~303 (sh.) | 21.65 |
| 314 | 26.35 |
| ~328 (sh.) | 20.35 | and as shown in FIG. 8 of the drawing;
(7) an I.R. absorption spectrum as shown in FIG. 7 of the drawing;
(8) a characteristic thin-layer chromatogram as shown in FIG. 10 of the drawing; and in its acid form,
(9) a characteristic thin-layer chromatogram as shown in FIG. 9 of the drawing, and recovering the carotenoids from the fermented medium.

23. In a process for increasing the titer of carotenoids in a negative strain fermentation of *Blakeslea trispora*, the improvement which comprises adding BC-Factor concentrate to the fermentation said concentrate comprising an admixture of BC-Factor A, B, $C_1$, and $C_2$, and being present in the fermentation medium during the fermentation by *Blakeslea trispora*, said BC-Factors A, B, $C_1$, and $C_2$ as recited in claim 22, and recovering the carotenoids from the fermented medium.

24. In a process for increasing the titer of carotenoids in a mated strain fermentation of *Blakeslea trispora*, the improvement which comprises adding a compound selected from the group consisting of the acids, esters, and salts of BC-Factor A, B, $C_1$, and $C_2$ to the fermentation, said compound being present in the fermentation medium during fermentation by *Blakeslea trispora*, said BC-Factors A, B, $C_1$, and $C_2$ as recited in claim 22, and recovering the carotenoids from the fermentation medium.

References Cited

UNITED STATES PATENTS

| 3,095,357 | 6/1963 | Fulde | 195—28 |
| 3,128,236 | 4/1964 | Zajic | 195—28 |

ALVIN E. TANENHOLTZ, Primary Examiner

U.S. Cl. X.R.

260—236.5, 410.9, 413

UNITED STATES PATENT OFFICE
CERTIFICATE OF CORRECTION

Patent No. 3,522,146  Dated July 28, 1970

Inventor(s) Herbert K. Jäger

It is certified that error appears in the above-identified patent and that said Letters Patent are hereby corrected as shown below:

Column 1, line 50, for "Mucur" read -- <u>Mucor</u> --; line 51, for "Choanephoro" read -- Choanephora --; line 51, for "Choanephoro" read -- Choanephora --. Column 5, line 30, for "spectrphotometrically" read -- spectrophotometrically --. Column 7, line 34, for "5" read -- 10 --; line 66, for "BC-filter" read -- BC-Factor --. Column 9, line 64, for "306" read -- 303 --. Column 10,
 line 42, for "factor" read -- Factors --; line 71, for "$C_{18}H_{26}O_4$" read -- $C_{18}H_{28}O_4$ --. Column 11, line 7, for "329" read -- ∼329 --.

SIGNED AND
SEALED

JAN 5 1971

(SEAL)
Attest:

Edward M. Fletcher, Jr.
Attesting Officer

WILLIAM E. SCHUYLER, JR.
Commissioner of Patents